United States Patent [19] [11] 3,996,747
Melchior [45] Dec. 14, 1976

[54] COMPRESSION-IGNITION INTERNAL COMBUSTION ENGINE AND METHOD OF SUPERCHARGING SUCH ENGINE

[75] Inventor: Jean F. Melchior, Paris, France
[73] Assignee: The French State, Paris, France
[22] Filed: Mar. 28, 1975
[21] Appl. No.: 563,134

[30] Foreign Application Priority Data
Mar. 29, 1974 France .......................... 74.11012

[52] U.S. Cl. .................................. 60/606; 60/614; 60/599
[51] Int. Cl.² ........................................ F02B 33/44
[58] Field of Search ............ 60/599, 606, 608, 614, 60/615, 617, 619

[56] References Cited
UNITED STATES PATENTS
2,633,698  4/1953  Nettel .................................. 60/606
3,163,984  1/1965  Dumont .............................. 60/606

Primary Examiner—Ronald H. Lazarus
Attorney, Agent, or Firm—Barnes, Kisselle, Raisch & Choate

[57] ABSTRACT

A four-stroke compression-ignition engine is supercharged by a compressor driven by a turbine. The turbine is fed in parallel by the exhaust manifold of the engine and by a passage provided with an auxiliary combustion chamber upstream of the exhaust manifold. The inlet and exhaust manifolds of the engine have distributing valves adapted to open these manifolds simultaneously during each transfer phase (exhaust plus inlet phase). The inlet and exhaust manifolds have a throttle to make gases heated by the auxiliary combustion chamber flow back into the cylinders of the engine in order to assist self-ignition.

39 Claims, 5 Drawing Figures

COMPRESSION-IGNITION INTERNAL COMBUSTION ENGINE AND METHOD OF SUPERCHARGING SUCH ENGINE

This invention relates to a power plant.

In particular, the invention concerns a power plant of the kind comprising: a four-stroke compression ignition internal combustion engine; a turbocompressor set for supercharging the engine and comprising a compressor, a turbine driving the same, and a passage communicating, preferably continuously, with the compressor outlet and the turbine inlet and serving to return to the turbine all that part of the compressor delivery which does not pass through the engine, the engine comprising a variable-volume working chamber so communicating via an inlet duct with the compressor outlet and via an exhaust duct with the passage as to be in parallel with some of the passage; and means for heating the gases entering the turbine, such means comprising an air inlet and a gas outlet, which outlet is connected to the passage upstream of that part thereof to which the exhaust duct extends.

The term "internal combustion engine having a variable-volume working chamber" is intended to denote any engine having at least one working chamber in which the inlet, compression, combustion/expansion and exhaust phases occur. The term relates generally to engines in which the or each working chamber is bounded by a piston moving, in relation to a cylinder or casing, either in reciprocation or in rotation (Wankel or other engines), as opposed to internal combustion engines, such as gas turbines, which have a fixed-volume working chamber. The term "transfer phase" will be used hereinafter to denote that part or portion of each engine operating cycle which corresponds to the whole of the exhaust phase, during which the working chamber is emptied of the combustion gases, and the inlet phase, during which fresh air is taken into the chamber.

As the foregoing shows the term "engine having a variablevolume working chamber" covers single-chamber and multiple-chamber engines. Also, a statement to the effect e.g. that the turbocompressor set comprises a compressor and a turbine or that the heating means comprise an air inlet, means that such set comprises at least one compressor and at least one turbine or that the heating means comprise at least one air inlet, the terminology having been chosen in order to simplify disclosure of the invention.

Power plant of the kind hereinbefore described is disclosed by various patents filled in the Applicants' name, inter alia British Pat. No. 1,291,030 and in applicant's corresponding U.S. application Ser. No. 139,080, filed Apr. 30, 1971, which was abandoned in favor of a continuation application Ser. No. 384,566, filed Aug. 1, 1973, which was also abandoned in favor of applicant's copending continuation-in-part application Ser. No. 437,748, filed Jan. 29, 1974.

Of course, engines of this kind have starting and slowrunning problems which are more difficult to deal with the lower the ambient temperature. Also, the problems are aggravated in diesel engines if the engine compression ratio is low, e.g. less than 12. The main reason for the extra difficulty is the excessive prolongation of the time taken to ignite the fuel-air mixture in the cylinder at the end of the compression stroke; the time taken for the ignition depends mainly upon the temperature and, to a lesser extent, the pressure of the mixture.

Various suggestions have been made to obviate this difficulty, including:

starting the turbocompressor set by starting means before starting the engine (U.S. Pat No. 2,633,698, French Pat. No. 1,574,193 and corresponding U.S. Pat. No. 3,570,240, British Pat. No. 1,291,030), and recirculating hot gases embodied by the engine exhaust gases or by gases from an auxiliary combustion chamber or by a mixture of both such kinds of gases (U.S. Spec. 2,633,698, Netherlands Pat. application No. 276,213, French Pat. No. 1,497,428 and the corresponding U.S. Pat. No. 3,423,927).

In cases in which the turbocompressor set is started before the engine, thermodynamic pressure and temperature conditions adequate for self-ignition of the fuel-air mixture at the end of the compression stroke can be provided at the engine intake, irrespective of outside climatic conditions. The power for operating the turbocompressor set in such circumstances is provided by an auxiliary combustion chamber which is disposed upstream of the turbine and supplied with fuel so that the thermodynamic pressure and temperature conditions as just outlined are provided.

The lower the engine compression ratio and the lower the ambient temperature, the more it will be necessary to burn fuel in the auxiliary combustion chamber. In some cases, engines have to operate for long periods in tickover or low-power conditions, e.g. as in the case of a marine engine driving a fixed-pitch screw which absorbs about 12% of maximum power at half the maximum speed and about 2% of the maximum power at 25% of the maximum speed.

Clearly, fuel consumption in the auxiliary combustion chamber greatly increases the fuel consumption of engines operating as just described.

The recirculation of hot gases, as a rule embodied by the engine exhaust gases, possibly after they have passed through an auxiliary combustion chamber, takes place between the intake and delivery pipes of the turbocompressor, as described in U.S. Pat. No. 2,633,698 and Netherlands Pat. No. 276,213. This system has the disadvantage of using very large volume rates of flow and of making the complete engine dependent on a special installation of the intake and delivery ducts.

In engines using gas recirculation of this kind and comprising a passage connecting the compressor outlet to the turbine inlet and an auxiliary combustion chamber upstream of the turbine, it is possible to recycle the hot gases from the engine or from the combustion chamber via pipes connecting the engine inlet manifold either to the engine exhaust or to a place somewhere between the chamber and the turbine. For recirculation to be able to occur, the exhaust manifold pressure must be higher than the inlet manifold pressure; to this end, and as suggested by U.S. Pat. No. 2,633,698 and French Pat. No. 1,497,428, means are provided to produce a pressure drop between the compressor outlet and the inlet manifold. Clearly, such means completely prevent engine scavenging — a great disadvantage.

When, as suggested by British Pat. No. 1,291,030, the engine has a passage permitting a direct and continuous flow from the compressor to the turbine and the passage is devoid of restricting means and is dimensioned to pass the whole compressor delivery, the static pressure at the turbine inlet will clearly always be below the static pressure at the outlet of the compressor once there is a flow in the passage. The provision of restricting means in the passage increases such pressure difference effect even more. Consequently, unless special provision is made there can be no recycling of the hot gases output from the combustion chamber.

Such recycling would be useful for, if the turbocompressor set has provision to start it before the engine is started, the thermodynamic pressure and temperature conditions suitable for engine starting and slow running can be produced in the engine intake (this possibility is suggested in British Pat. No. 1,291,030). In this event, the combustion chamber is so supplied with fuel that the air delivered by the compressor has the required thermodynamic pressure and temperature conditions.

Unfortunately, the procedure just outlined is expensive, becoming dearer in proportion as the engine compression ratio and the ambient temperature are lower. Taking as an example a 3,000 h.p. engine with a compression rate of 7, it will start and tick over readily if the engine air intake temperature is 110° C. At an ambient temperature of −30° C, a compression ratio of 3.5 is needed for heating to such a temperature by adiabatic compression at 75% efficiency of air in the compressor. Such a ratio can be provided if fuel is supplied to the combustion chamber at a rate of 140 liters/hour.

It is an object of the invention to obviate or at least to reduce these difficulties.

According to the invention, in a power plant of the kind defined hereinbefore, the inlet duct and the exhaust duct have distributing means adapted to open them simultaneously during at least part of each transfer phase, such part being, with advantage, near the end of the exhaust phase and the beginning of the inlet phase, and restricting means are provided in the inlet duct to reduce the pressure therein downstream of the restricting means to a value, relative to the pressure existing at the same time in the exhaust duct, which permits a cyclic reflux of gases heated by the heating means into the working chamber, the restricting means being adapted to come into operation in the case in which, without the cyclic reflux, the air taken into the working chamber would, because of inadequate temperature and pressure conditions, fail to produce self-ignition.

Consequently, an adjustable proportion of the hot gases (at temperatures of from 400° to 600° C) which are available at the output of the heating means is refluxed during each cycle, yet the intake air temperature can be, in severe cold conditions (when the ambient temperature is of the order of −30° C), of the order of 20° C and the exhaust gas temperature can be less than 200° C — i.e., much lower than the temperature of the hot gases leaving the heating means. The latter hot gases heat the working-chamber walls and possibly the walls of the terminal part of the inlet pipe and also mix with the air which the compressor has delivered and which has entered the engine working chamber through the inlet pipe. Cold starting, slow running and low-power operation are therefore facilitated.

Preferably, the heating means are connected in series with the passage, so that the air inlet of the heating means is embodied by at least a part of the portion of the passage which is disposed upstream of the heating means.

Preferably too, the restricting means in the inlet duct are so actuated by means sensitive to the pressure at a selected place anywhere in the passage, inter alia to the air pressure at the compressor outlet, that the air cross-section left free by the restricting means in the inlet duct becomes a maximum beyond a critical value of such pressure, above which critical value the pressure and temperature conditions of the air delivered by the compressor are adequate to ensure self-ignition conditions for the fuel in the working chamber at a part of the cycle near the end of the compression phase. To achieve self-ignition conditions, the value of such pressure is determined in the light of the pressure and more particularly temperature conditions of the air taken in by the compressor and of compressor efficiency and also inter alia in dependence upon the engine compression ratio and bore size, the temperature of the walls of the working chamber and so on.

For a given cross-section left open by the distributing means for the combustion gases to reflux to the working chamber, the refluxed quantity depends upon the pressure difference produced between the inlet and exhaust ducts by the restricting means and also upon the time for which communication between the exhaust and the inlet lasts — i.e., upon engine speed.

The cross-section which the restricting means leave open to the compressor air delivery should therefore be controlled by actuating means sensitive to the pressure of the supercharging air so as to be at a maximum when such pressure exceeds a critical value. Also, the metering of the combustion gas reflux to the working chamber should be effected through the agency of the latter actuating means, inter alia in inverse proportion to the temperature of the air taken in by the compressor in the light of engine speed. The pressure difference between the inlet and the exhaust must increase with increasing engine speed to compensate for the fact that communication between the inlet and the exhaust lasts for a shorter time.

This engine-speed-dependent control can be provided by associating the actuating means with a tachometer element.

However, a possible compromise to avoid using a tachometer is to maintain the pressure difference substantially constant and just enough to prevent the fresh air from removing the gases burnt in the working chamber during that part of the transfer phase in which there is direct communication between the inlet and the exhaust. Consequently, at the start of the inlet phase when the inlet and exhaust ducts communicate with one another, the engine aspirates combustion gases delivered by the auxiliary combustion chamber. The aspirated volume must therefore be greater than the volume of the exhaust pipe connecting the working chamber to the passage downstream of the auxiliary combustion chamber. The rate of flow of cyclic gas reflux then becomes independent of engine speed. In this case, the actuating means for the restricting means is preferably also sensitive to the temperature of the air taken in by the compressor so that the critical air pressure value varies inversely to the latter temperature.

According to another aspect of the invention, there is provided a method of supercharging a four-stroke compression ignition internal combustion engine, which engine is supercharged by a turbocompressor set comprising a compressor, a turbine driving the same, a passage communicating, preferably continuously, with the compressor outlet and the turbine inlet, and starting means, the passage being adapted to return to the turbine all that proportion of the compressor delivery which does not go through the engine, the engine having a variable-volume working chamber communicating by way of an inlet duct with the compressor outlet and by way of an exhaust duct with the passage, so that the working chamber is in parallel with some of the passage, the compression ratio of the engine being too low for self-ignition of the fuel-air mixture taken into the working chamber at ambient pressure and temperature and at a part of the cycle near the end of the compression phase, the engine having distributing means in the inlet and exhaust ducts, and there being associated with the engine an auxiliary combustion chamber comprising an air inlet and a gas outlet, which outlet is connected to the passage upstream of that part of the passage to which the exhaust duct extends, which method includes: so controlling the distributing means that the same open the inlet and exhaust ducts simultaneously during at least part of each transfer phase; starting the turbo-compressor set by means of its starter and introducing a sufficient quantity of fuel into the auxiliary combustion chamber for independent operation of the turbocompressor set; adjusting to its minimum value the free cross-section for the air in the inlet duct so as to produce, at starting of the engine, cyclic reflux of the combustion gases delivered by the auxiliary combustion chamber in sufficient quantity for starting the engine; starting the engine; and keeping the speed of the turbocompressor set above a critical minimum value in all operating conditions including idling and low power operation and producing between the exhaust duct and the inlet duct of the engine a pressure difference sufficient, during the aforesaid part of each transfer phase, for the mixture of air which the compressor has delivered and which has reached the engine working chamber through the inlet duct and of the combustion gases which the auxiliary combustion chamber has delivered and which have reached the engine working chamber through the exhaust duct as a result of such pressure difference, to be in appropriate temperature and pressure conditions for self-ignition of the fuel in the working chamber at the aforesaid part of the cycle near the end of the compression phase.

Advantageously, the distributing means are controlled to open the inlet and exhaust ducts simultaneously during that part of each transfer phase which is near the end of the exhaust phase and the start of the inlet phase.

It has been previously been stated herein that the compression ratio was too low for self-ignition of the fuel-air mixture, taken into the working chamber at ambient pressure and temperature. No exact numerical value can be given for the critical compression ratio below which compression ignition ceases for of course chemical kinetics produce such conditions at the end of compression that the ignition time is short enough at all speeds and more particularly during idling. The ignition time depends upon the end-of-compression pressure and temperature which in turn depend upon inlet conditions and the compression ratio. What can be stated is that the critical value, which can be determined readily on a test bench, varies from 12 for large-bore piston engines to 17 for piston small-bore engines.

In order that the invention may be readily understood, embodiments thereof will now be described in more detail, by way of example, with reference to the accompanying drawings, in which.

Figure 1:
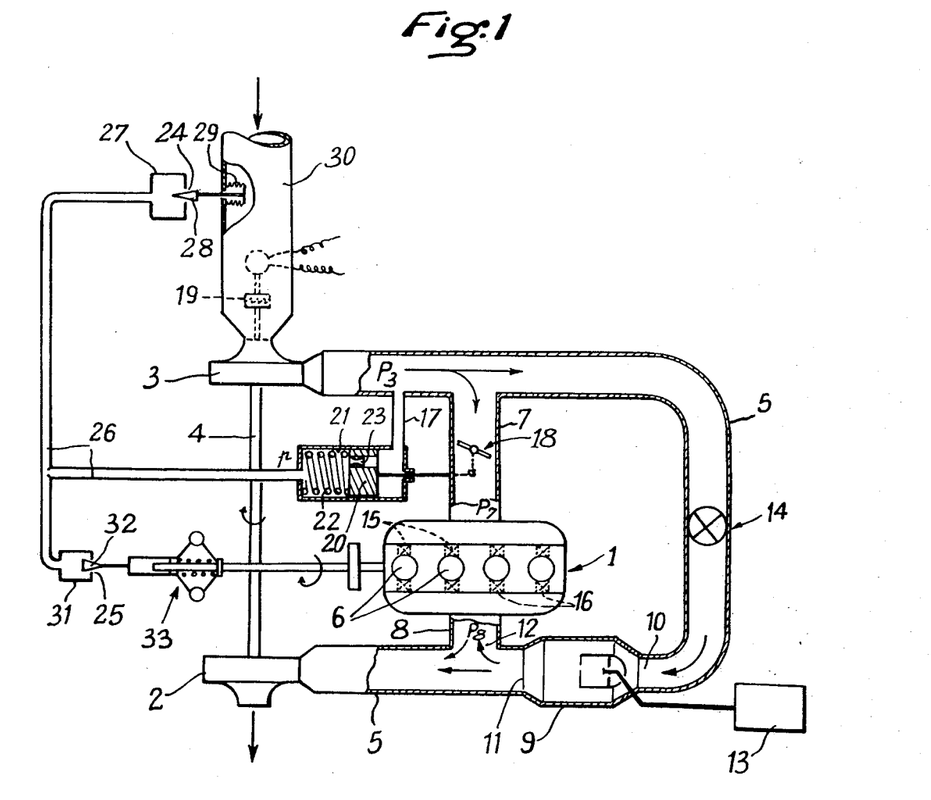
FIG. 1 is a diagrammatic view, partly in plan and partly in section, of a supercharged diesel power plant embodying the invention and for the practice of the method according to the invention.
Figure 2:
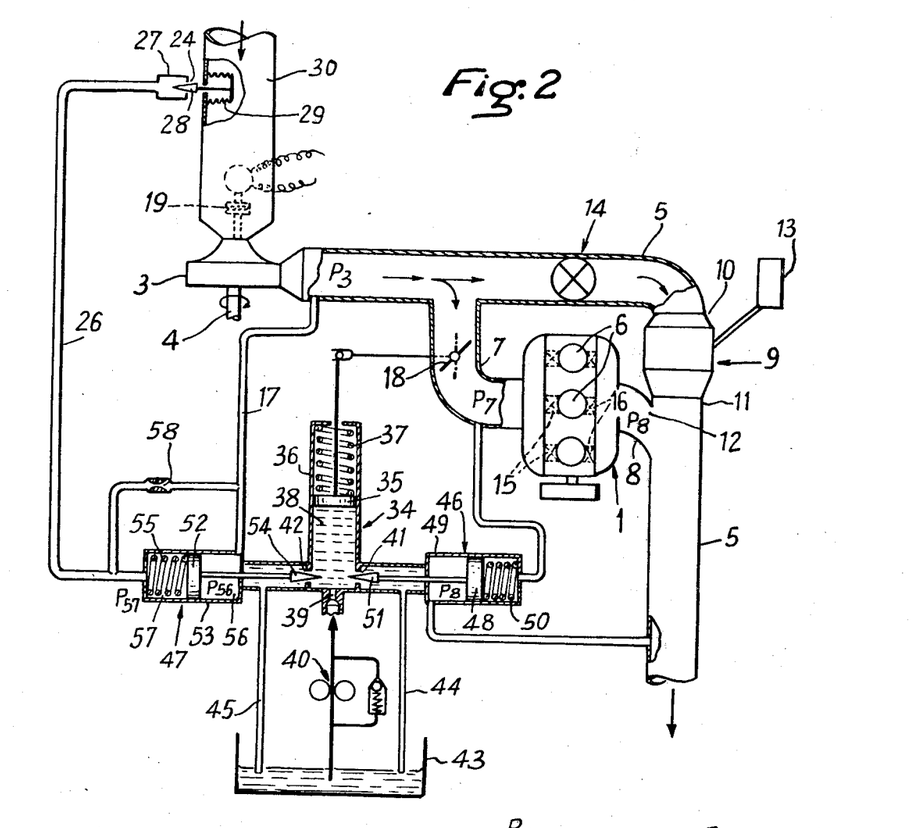
FIG. 2 is a view similar to FIG. 1 of a supercharged diesel power plant according to a second embodiment of the invention, some of the elements of FIG. 1 (end of the passage, turbine and connecting shaft between the same and the compressor) having been omitted from FIG. 2 for the sake of clarity.

A diesel engine 1 in the cases of both FIGS. 1 and 2 is supercharged by a turbocompressor set comprising a compressor 3, a turbine 2 driving the same via a shaft 4, and a passage 5 which communicates, preferably continuously, with the compressor outlet and with the turbine inlet. Arrows in FIGS. 1 and 2 denote the flow direction of air and other gaseous mixtures.

Engine 1 has a number of variable-volume working chambers 6, four such chambers in FIG. 1 and three in FIG. 2, which communicate via an inlet pipe 7 with the compressor outlet, as a rule by way of an upstream portion of passage 5. The chambers 6 so communicate by way of an exhaust pipe 8 with passage 5 that the chambers 6 are connected in parallel with a portion of the passage 5 through the agency of the ducts 7 and 8. A supercharging air cooler (not shown) is fitted to the inlet manifold 7.

The power plant also comprises heating means 9 comprising an air inlet 10 and a gas outlet 11, said outlet being connected to passage 5 upstream from that part 12 of the passage to which the exhaust duct or manifold 8 is connected. The heating means are usually embodied by an auxiliary combustion chamber which receives air through the passage 5 and fuel from a fuel supply system 13.

Somewhere between where it leaves manifold 7 and the portion 12 where it is joined by the exhaust duct or manifold 8, the passage 5 has restricting means 14 which produce, from upstream to downstream, a pressure difference which, at a given value of pressure immediately upstream of the means 14, is independent of the rate of flow therethrough and which is an increasing function of the latter pressure. Preferably, the restricting means 14 are devised in accordance with French Pat. No. 72,12113 of Apr. 6, 1972 and of French Pat. No. 73,10041 of Mar. 29, 1973 and the corresponding U.S. application Ser. No. 345,968, filed Mar. 29, 1973, now abandoned in favor of applicant's copending continuation-in-part application Ser. No. 437,748, filed Jan. 29, 1974. According to the latter French application, the fuel supply system 13 and the rate of air flow supplying the primary zone of the auxiliary combustion chamber 9 are acted on so as to maintain a ratio between the rates of air and fuel flow ensuring satisfactory stability of combustion. The turbocompressor set 2, 3 also has starting means 19 including a starter for starting the rotors of turbine 2 and compressor 3. The engine 1 of course also has a starter.

In accordance with the invention, the inlet manifold 7 and the exhaust manifold 8 have respective distributing means 15, 16 which are associated with the various chambers 6 and which are adapted to open each chamber 6 to the manifolds 7 and 8 simultaneously during at least a portion of each transfer phase, such portion being, with advantage, near the end of the exhaust phase and the start of the inlet phase. Of course, such simultaneous opening is offset as between consecutive chambers 6. Also, restricting means 18 are provided in the inlet manifold 7 to reduce the pressure therein downstream (in the ordinary flow direction) of the restricting means to a value such, relative to the pressure existing at the same time in the exhaust manifold 8, as to permit a cyclic reflux of gases heated by the heating means 9 into the chambers 6. The means 18 are adapted to operate in the case in which, without cyclic reflux, the air entering the chambers 6 would be at too low a temperature and pressure to produce self-ignition.

Figure 4:
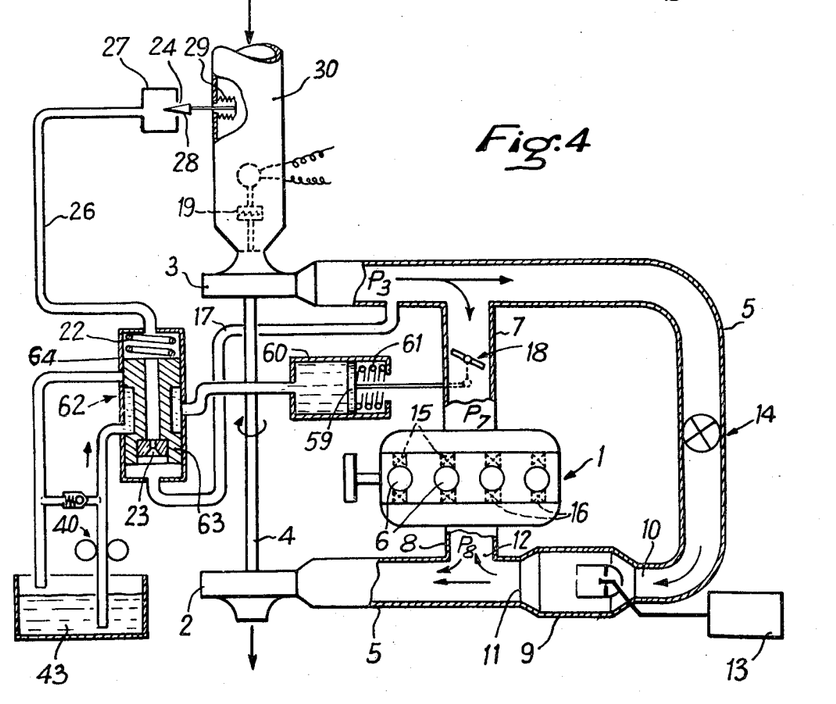
FIG. 4 is a view similar to FIG. 1 of a supercharged diesel power plant according to a third embodiment.

As FIGS. 1, 2 and 4 show, the heating means 9 are arranged in series in the passage 5, the air inlet 10 being embodied by at least a fraction (entirely, in the embodiments shown) of that part of the passage 5 which is upstream of the heating means 9.

The restricting means 18 are so actuated by means sensitive to the air pressure at the compressor outlet that the cross-section which the means 18 leave open to the air in the inlet manifold 7 increases with the latter pressure and becomes a maximum with effect from a critical pressure value high enough to provide fuel self-ignition conditions in the chambers 6 at a place near the end of the compression phase. Instead of the air pressure at the compressor outlet being used, it is possible to use a pressure at some other place in the passage 5, since the value of one of these pressures corresponds to a single value of the other pressure.

In the embodiment of FIG. 1, the restricting means 18, for instance, in the form of a butterfly valve, are actuated by a piston 20 sliding in a cylinder 21 and biased against the air pressure $P_3$ at the compressor outlet which pressure acts through a duct 17, by the combined force of a spring 22 and a variable backpressure $p$. The backpressure is produced by a communication operative between the two faces of piston 20 by way of a small fixed-section orifice 23, which preferably extends through the piston 20, and by an adjustable leak to atmosphere from the cylinder 21.

Advantageously, the adjustable leak is achieved by means of a nozzle 24, the cross-section of which varies in the same way as the temperature of the air taken in by the compressor 3, and/or by a nozzle 25 whose cross-section varies inversely with engine speed. Accordingly, cylinder 21 can be connected by a line 26 to a box 27 having the nozzle 24, with which co-operates a needle valve 28 operated by expanding bellows 29 received in the turbine inlet 30, and to a box 31 receiving the nozzle 25 with which co-operates a needle valve 32 operated by an engine-speed-sensitive mechanism 33, the latter mechanism being diagrammatically represented in FIG. 1 as a centrifugal ball type governor.

Clearly, the result is the production of a pressure $P_7$, in inlet manifold 7 downstream of the restricting means 18, which at starting and low powers is below the pressure $P_8$ in the exhaust manifold 8, so that during each transfer phase there is a reflux towards the working cylinders or chambers 6 of some of the gases heated by the heating means 9. This results in heating of the walls of the cylinders and, as a result of mixing with the reflux, of the air which the compressor has delivered and which has reached the cylinders, thus making it possible to have self-ignition of the fuel introduced into the cylinders or working chambers 6 during each cycle. When the pressure $P_3$ reaches a predetermined limit, the restricting means 18 is fully open and the engine runs under normal conditions — i.e. with no reflux of hot gases through the exhaust manifold 8. The limit or critical value for the pressure is lower in proportion as the temperature To of the air taken into compressor 3 is higher (effect of the variable nozzle 24) and as engine speed is lower (effect of the variable nozzle 25) if such nozzles have been provided.

In the embodiment shown in FIG. 2, the cross-section left open by the restricting means 18 does not vary in the same way as in FIG. 1. More particularly, the position of the means 18 of FIG. 2 is controlled by the pressure drop between the inlet and the exhaust and so, in contrast to the restricting means 18 of FIG. 1, does not directly depend upon the value of the pressure $P_3$ of the air delivered by the compressor 3 nor upon the speed of the engine 1 (nozzle 25). Depending on the operation of engine 1, the restricting means 18 of FIG. 2 are adapted to open or close to keep the drop between the inlet and the exhaust constant until the critical pressure hereinbefore referred to has been reached. When the supercharging air pressure $P_3$ comes near the latter value, the restricting means 18 open gradually until fully open; correspondingly, the pressure drop between the engine inlet and exhaust disappears, then takes up a value determined by the restricting means 14 which are usually provided in the passage 5.

The restricting means 18, such as a butterfly valve or plug or cock or the like, are actuated by a jack or ram or the like 34 in which a piston 35 sliding in a cylinder 36 experiences the opposing biases of a spring 37 on one face and the pressure of a fluid filling chamber 38 of cylinder 36 on its other face. Chamber 38 is supplied with pressure fluid through a fixed nozzle 39 by means of a constant-pressure pump 40, such as a gear pump working into a calibrated valve. The pressure of the fluid in chamber 38 is varied through the agency of two variable nozzles 41, 42 for controlling rates of return flow to a pan 43 (if the fluid used is a liquid) through ducts 44, 45. Opening of the nozzles 41 and 42 is controlled by means of a slave unit 46 and a pilot unit 47 respectively.

If, for instance, the pilot element 47 is immobilised, the opening left by the restricting means 18 is subjected to the pressure difference between the exhaust manifold 8 ($P_8$) and the inlet manifold 7 downstream of the restricting element ($P_7$). Accordingly, the servo unit 46 comprises a piston 48 which slides in a cylinder 49 and which experiences the opposing actions of the pressure $P_8$ on one face and of the pressure $P_7$ plus the force of a spring 50 on its other face. Consequently, piston 48 is in equilibrium when the pressure difference $P_8$-$P_7$ is equal to the force of the spring 50 divided by the cross-section of the piston 48. A needle 51 rigidly secured to the piston 48 and cooperating with a calibrated orifice serves as a means of controlling the opening of the variable nozzle 41. If the pressure drop in the inlet duct 7 is excessive, i.e., P7 is too low, the opening of the variable nozzle 41 is increased by a movement of piston 48 and needle 51 to the right in FIG. 2, and the pressure in chamber 38 drops, so that the jack piston 35 descends and opens the restricting means 18 until the pressure $P_7$ returns to normal.

The pilot unit 47 is a means of shifting the operating range of the servo element 46. The pilot unit 47 is embodied by a piston 52 which slides in a cylinder 53 and which is rigidly secured to a needle 54 cooperating with a fixed orifice and adapted to vary the opening of the variable nozzle 42. Piston 52 experiences opposing biases — on one face the pressure $P_{56}$, derived anywhere in passage 5 and transmitted to chamber 56 of cylinder 53, and on the other face the combined force of a spring 55 and a backpressure $P_{57}$ in that chamber 58 of cylinder 53 which is opposite chamber 57. In the embodiment described, the pressure 56 acting through duct 17 is equal to the compressor outlet pressure $P_3$. The backpressure $P_{57}$ is somewhere between atmospheric pressure and the sampling pressure $P_{56}$ in passage 5, since it is supplied through a fixed nozzle 58 with the super-charging air and also communicates with atmosphere by way of a variable nozzle 24 devised as in FIG. 1. Consequently, the pressure difference $P_{56} - P_{57}$ on the piston 52 gradually increases in proportion as the supercharging pressure $P_3$ increases. Consequently, as the latter pressure increases, i.e. as the power output by the engine 1 increases, the piston 52 moves and increases the opening of the variable nozzle 42. The pressure in chamber 38 then tends to drop and the restricting means 18 tend to open. The servo unit 46 then operates and corrects the position of the means 18 to maintain the difference $P_7 - P_8$ constant until the servo unit 46 reaches the end of its travel, whereafter the servo unit 46 is neutralised. For any further increase in the pressure acting on the pilot unit 47, the opening of the variable nozzle 42 increases until the restricting means 18 are fully open. The pressure at which the servo unit 46 reaches the end of its travel therefore defines the limit or critical value referred to hereinbefore.

As will be readily apparent, the critical value is reached more quickly, i.e. the element 46 reaches the end of its travel more quickly, in proportion as the opening of the variable nozzle 42 increases faster, i.e., as the pressure in chamber 57 is lower.

The critical pressure value can therefore be varied by action on the opening of the variable nozzle 24. The opening (free cross-section) of the nozzle 24 increases as the compressor air intake temperature $T_0$ increases. Consequently, the pressure $P_{57}$ in chamber 57 decreases when the temperature $T_0$ increases, and so the critical supercharging pressure $P_3$ beyond which the restricting means 18 are fully open is reached sooner. The means 18 controlling exhaust gas cyclic refluxing are therefore neutralised and made inoperative once the power developed by the engine 1 has reached a desired level, the neutralisation power being less in proportion as the compressor air intake temperature $T_0$, i.e., the ambient temperature, is higher.

Figure 3:
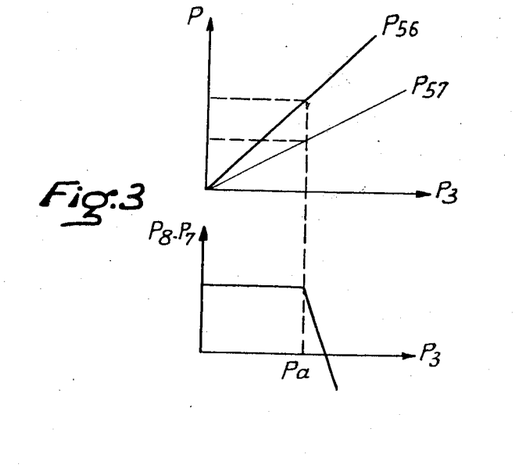
FIG. 3 shows the pattern of the various pressures in the power plant shown in FIG. 2.

FIG. 3 shows the variation of the pressures $P_{56}$ and $P_{57}$ at the top and, at the bottom, the relationship between the pressure difference $P_8 - P_7$ and the supercharging pressure $P_3$. The critical pressure beyond which the restricting means 18 become inoperative has the reference Pa.

The siting of the heating means 9 upstream of the passage portion 12 to which the exhaust manifold 8 is connected is very important, since such siting is what enables the hot gases issuing from the means 9 to reflux cyclically to the chambers 6; such refluxing would be impossible if the heating means 9 were positioned downstream of the passage portion 12.

Whichever embodiment is used, the engine may be started as follows:

The turbocompressor set 2–4 is started by means of the turbocompressor starter 19, and the supply system 13 introduces fuel into the auxiliary combustion chamber embodying the heating means 9 in sufficient quantity for independent operation of the turbocompressor set. The means 18 are then used to reduce to a minimum the free cross-section presented to the air in the inlet duct so as to produce at starting of the engine 1 a cyclic reflux of the combustion gases delivered by the auxiliary combustion chamber 9 in sufficient quantity to enable starting of the engine, whereafter the engine 1 is started by means of its starter.

The speed of the set 2 – 4 is maintained above a minimum in all operating conditions of engine 1, including idling and low-power operation, and the restricting means 18 produce between the exhaust manifold 8 and the inlet manifold 7 the pressure difference which, while natural pressure and temperature conditions — i.e., the conditions which exist in the absence of the restricting means 18 — prevent self-ignition in the working chambers, makes it possible to modify such conditions so that they are suitable for self-ignition.

The main advantage of the invention is that it helps to provide a very large reduction — of 100 to 200% in the consumption of the fuel delivered by the system 13 for the minimum turbine speed adequate to ensure self-ignition in the chambers 6 in all circumstances.

The invention is not of course limited to the embodiments hereinbefore described, as various modifications are possible.

For example, as can be seen in FIG. 4 th restricting means 18 can have an on/off control. To this end, the means 18 can be actuated by a piston 59 moving in a cylinder 60. The piston 59 can be moved to close the means 18, against the force of a return spring 61, by the pressure of a pressure liquid delivered by a pump 40 similar to the pump of FIG. 2. Interposed between the pump 40 and the cylinder 60 is a distributor 62 having a spool 63 movable in a cylinder 64 connected at one end via a duct 17 to passage 5 and at the other end via a duct 26 to a nozzle 24.

The two faces of the spool 63 communicate by way of a narrow orifice 23, and a spring 22 acts on the spool 63. The elements 17, 22 – 24, 26 of FIG. 4 are similar to the elements having the same references in FIGS. 1 and 2. When in the position shown, the distributor 62 so connects the pump 40 to the cylinder 60 that the restricting means 18 are fully closed. When the compressor air intake temperature rises, nozzle 24 opens and the pressure drop across the orifice 23 increases until it has become sufficient to overcome the spring 22 and lift the spool 63, interrupting communication between the pump 40 and the cylinder 60 so that the spring 61 can fully open the restricting means 18 at a pressure $P_3$ (duct 17) which varies according to the temperature (bellows or diaphragm or the like 29).

In FIGS. 1, 2 and 4, the exhaust gases of each chamber or cylinder 6 go to an exhaust manifold which a single duct 8 connects to the downstream portion of the gas outlet of the heating means — i.e. the auxiliary combustion chamber — 9. Such a system may fail to operate satisfactorily in some circumstances, since the gases recycled by back-scavenging must come from the chamber 9 (very hot gases containing little, if any, unburnt constituents). If the volume of the exhaust manifold and duct 8 is too large, the gases recycled by back scavenging come not from the auxiliary combustion chamber but from the nearby cylinders 6, so that the required effect is not provided and the engine 1 may stall due to reaspirating the unburnt constituents.

Figure 5:
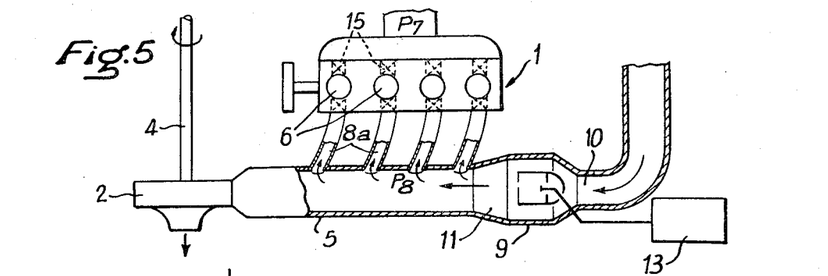
FIG. 5 shows a modification of the embodiments of FIGS. 1, 2 and 4.

Conveniently, and as shown in FIG. 5, to obviate this disadvantage the exhaust manifold is omitted and the various cylinders 6 are connected by individual exhaust pipes 8a to the gas output 11 of chamber 9. More particularly, the volume of gases recycled by back scavenging must be greater than the volume of each duct 8a connecting the exhaust zone of the corresponding cylinder 6 to the combustion chamber gas outlet 11. This ensures that the combustion gases of the chamber 9 are recycled.

What I claim is:

1. A power plant comprising a four-stroke compression ignition internal combustion engine; a turbocompressor set for supercharging the engine and comprising a compressor, a turbine driving the same, and a passage communicating with the compressor outlet and the turbine inlet and serving to return to the turbine all that part of the compressor delivery which does not pass through the engine, the engine comprising a variable-volume working chamber so communicating via an inlet duct with the compressor outlet and via an exhaust duct with the passage as to be in parallel with some of the passage; and means for heating the gases entering the turbine, such means comprising an air inlet and a gas outlet, which outlet is connected to the passage upstream of that part thereof to which the exhaust duct extends; in which power plant the inlet duct and the exhaust duct have distributing means adapted to open them simultaneously during at least part of each transfer phase, such part being, with advantage, near the end of the exhaust phase and the beginning of the inlet phase; and restricting means are provided in the inlet duct to reduce the pressure therein downstream of the restricting means to a value, relative to the pressure existing at the same time in the exhaust duct, which permits a cyclic reflux of gases heated by the heating means into the working chamber, the restricting means being adapted to come into operation in the case in which, without the cyclic reflux, the air taken into the working chamber would, because of inadequate temperature and pressure conditions, fail to produce self-ignition.

2. A power plant according to claim 1 in which the heating means are connected in series with the passage, so that the air inlet of the heating means is embodied by at least a part of the portion of the passage which is disposed upstream of the heating means.

3. A power plant according to claim 1 in which the restricting means in the inlet duct are so actuated by means sensitive to the pressure at a selected place anywhere in the passage that the air cross section left free by the restricting means in the inlet duct becomes a maximum beyond a critical value of such pressure, above which critical value the pressure and temperature conditions of the air delivered by the compressor are adequate to ensure self-ignition conditions for the fuel in the working chamber at a part of the cycle near the end of the compression phase.

4. A power plant according to claim 2 in which the restricting means in the inlet duct are so actuated by means sensitive to the pressure at a selected place anywhere in the passage that the air cross section left free by the restricting means in the inlet duct becomes a maximum beyond a critical value of such pressure, above which critical value the pressure and temperature conditions of the air delivered by the compressor are adequate to ensure self-ignition conditions for the fuel in the working chamber at a part of the cycle near the end of the compression phase.

5. A power plant according to claim 3 in which the actuating means for the restricting means are sensitive to the air pressure at the compressor outlet.

6. A power plant according to claim 4 in which the actuating means for the restricting means are sensitive to the air pressure at the compressor outlet.

7. A power plant according to claim 3 in which the actuating means for the restricting means are also sensitive to the temperature of the air taken in by the compressor so that the critical air pressure value varies inversely with the latter temperature.

8. A power plant according to claim 4 in which the actuating means for the restricting means are also sensitive to the temperature of the air taken in by the compressor so that the critical air pressure value varies inversely with the latter temperature.

9. A power plant according to claim 5 in which the actuating means for the restricting means are also sensitive to the temperature of the air taken in by the compressor so that the critical air pressure value varies inversely with the latter temperature.

10. A power plant according to claim 6 in which the actuating means for the restricting means are also sensitive to the temperature of the air taken in by the compressor so that the critical air pressure value varies inversely with the latter temperature.

11. A power plant according to claim 3 in which the system embodied by the restricting means and actuating means therefor is so devised that the free cross section increases from a minimum to a maximum in proportion as the pressure increases to the critical value.

12. A power plant according to claim 4 in which the system embodied by the restricting means and actuating means therefor is so devised that the free cross section increases from a minimum to a maximum in proportion as the pressure increases to the critical value.

13. A power plant according to claim 5 in which the system embodied by the restricting means and actuating means therefor is so devised that the free cross section increases from a minimum to a maximum in proportion as the pressure increases to the critical value.

14. A power plant according to claim 6 in which the system embodied by the restricting means and actuating means therefor is so devised that the free cross section increases from a minimum to a maximum in proportion as the pressure increases to the critical value.

15. A power plant according to claim 7 in which the system embodied by the restricting means and actuating means therefor is so devised that the free cross section increases from a minimum to a maximum in proportion as the pressure increases to the critical value.

16. A power plant according to claim 8 in which the system embodied by the restricting means and actuating means therefor is so devised that the free cross section increases from a minimum to a maximum in proportion as the pressure increases to the critical value.

17. A power plant according to claim 9 in which the system embodied by the restricting means and actuating means therefor is so devised that the free cross section increases from a minimum to a maximum in proportion as the pressure increases to the critical value.

18. A power plant according to claim 10 in which the system embodied by the restricting means and actuating means therefor is so devised that the free cross section increases from a minimum to a maximum in proportion as the pressure increases to the critical value.

19. A power plant according to claim 15 in which the system embodied by the restricting means and the actuating means thereof is so devised that, at a given pressure value below the critical value, the free cross section varies inversely with the temperature of the air taken in by the compressor.

20. A power plant according to claim 15 in which the actuating means for the restricting means is also sensitive to engine speed so that, at a given pressure value below the critical value, the free cross section varies inversely with such speed.

21. A power plant according to claim 19 in which the actuating means for the restricting means is also sensitive to engine speed so that, at a given pressure value below the critical value, the free cross section varies inversely with such speed.

22. A power plant according to claim 3 in which the restricting means are actuated by means sensitive to the pressure difference between the exhaust duct and the inlet duct downstream of the restricting means, so that when the same are in operation such difference is at a substantially constant value.

23. A power plant according to claim 4 in which the restricting means are actuated by means sensitive to the pressure difference between the exhaust duct and the inlet duct downstream of the restricting means, so that when the same are in operation such difference is at a substantially constant value.

24. A power plant according to claim 5 in which the restricting means are actuated by means sensitive to the pressure, difference between the exhaust duct and the inlet duct downstream of the restricting means, so that when the same are in operation such difference is at a substantially constant value.

25. A power plant according to claim 6 in which the restricting means are actuated by means sensitive to the pressure difference between the exhaust duct and the inlet duct downstream of the restricting means, so that when the same are in operation such difference is at a substantially constant value.

26. A power plant according to claim 7 in which the restricting means are actuated by means sensitive to the pressure difference between the exhaust duct and the inlet duct downstream of the restricting means, so that when the same are in operation such difference is at a substantially constant value.

27. A power plant according to claim 8 in which the restricting means are actuated by means sensitive to the pressure difference between the exhaust duct and the inlet duct downstream of the restricting means, so that when the same are in operation such difference is at a substantially constant value.

28. A power plant according to claim 9 in which the restricting means are actuated by means sensitive to the pressure difference between the exhaust duct and the inlet duct downstream of the restricting means, so that when the same are in operation such difference is at a substantially constant value.

29. A power plant according to claim 10 in which the restricting means are actuated by means sensitive to the pressure difference between the exhaust duct and the inlet duct downstream of the restricting means, so that when the same are in operation such difference is at a substantially constant value.

30. A power plant according to claim 1 in which the turbocompressor set has starting means enabling it to operate independently before the engine is started.

31. A power plant according to claim 18 in which the turbocompressor set has starting means enabling it to operate independently before the engine is started.

32. A power plant according to claim 21 in which the turbocompressor set has starting means enabling it to operate independently before the engine is started.

33. A power plant according to claim 21 in which the turbocompressor set has starting means enabling it to operate independently before the engine is started and in which the restricting means are actuated by means sensitive to the pressure difference between the exhaust duct and the inlet duct downstream of the restricting means, so that when the same are in operation such difference is at a substantially constant value.

34. A power plant according to claim 1 in which the passage communicates continuously with the compressor outlet and the turbine inlet.

35. A power plant according to claim 18 in which the passage communicates continuously with the compressor outlet and the turbine inlet.

36. A power plant according to claim 21 in which the passage communicates continuously with the compressor outlet and the turbine inlet.

37. A power plant according to claim 33 in which the passage communicates continuously with the compressor outlet and the turbine inlet.

38. A method of supercharging a four-stroke compression ignition internal combustion engine, which engine is supercharged by a turbocompressor set comprising a compressor, a turbine driving the same, a passage communicating with the compressor outlet and the turbine inlet, and starting means, the passage being adapted to return to the turbine all that proportion of the compressor delivery which does not go through the engine, the engine having a variable-volume working chamber communicating by way of an inlet duct with the compressor outlet and by way of an exhaust duct with the passage, so that the working chamber is in parallel with some of the passage, the compression ratio of the engine being too low for self-ignition of the fuel-air mixture taken into the working chamber at ambient pressure and temperature and at a part of the cycle near the end of the compression phase, the engine having distributing means in the inlet and exhaust ducts, and there being associated with the engine an auxiliary combustion chamber comprising an air inlet and a gas outlet, which outlet is connected to the passage upstream of that part of the passage to which the exhaust duct extends, which method includes: so controlling the distributing means that the same open the inlet and exhaust ducts simultaneously during at least part of each transfer phase; starting the turbocompressor set by means of its starter and introducing a sufficient quantity of fuel into the auxiliary combustion chamber for independent operation of the turbocompressor set; adjusting to its minimum value the free cross section for the air in the inlet duct so as to produce, at starting of the engine, cyclic reflux of the combustion gases delivered by the auxiliary combustion chamber in sufficient quantity for starting the engine; starting the engine; and keeping the speed of the turbocompressor set above a critical minimum value in all operating conditions including idling and lowpower operation and producing between the exhaust duct and the inlet duct of the engine a pressure difference sufficient, during the aforesaid part of each transfer phase, for the mixture of air which the compressor has delivered and which has reached the engine working chamber through the inlet duct and of the combustion gases which the auxiliary combustion chamber has delivered and which have reached the engine working chamber through the exhaust duct as a result of such pressure difference, to be in appropriate temperature and pressure conditions for self-ignition of the fuel in the working chamber at the aforesaid part of the cycle near the end of the compression phase.

39. A method according to claim 38 wherein the distributing means are controlled to open the inlet and exhaust ducts simultaneously during that part of each transfer phase which is near the end of the exhaust phase and the start of the inlet phase.

* * * * *

UNITED STATES PATENT OFFICE
CERTIFICATE OF CORRECTION

PATENT NO. : 3,996,747
DATED : December 14, 1976
INVENTOR(S) : Jean F. Melchior

It is certified that error appears in the above-identified patent and that said Letters Patent are hereby corrected as shown below:

Column 1, line 52   - cancel "filled" and insert --filed--
Column 2, line 44   - after "Pat." insert --application--
Column 5, line 50   - cancel "been" (second occurrence)
Column 6, line 52   - cancel "of" (second occurrence)
Column 6, line 58   - cancel "application" and insert --patent--
Column 8, line 22   - before "drop" insert --pressure--
Column 10, line 25 - insert a dash (-) after "200%"
Column 10, line 32 - cancel "th" and insert --the--
Column 13, line 41 - cancel the comma (,) after "pressure"

Signed and Sealed this

Fourteenth Day of June 1977

[SEAL]

Attest:

RUTH C. MASON
Attesting Officer

C. MARSHALL DANN
Commissioner of Patents and Trademarks